(12) United States Patent
Lundquist

(10) Patent No.: US 12,350,550 B2
(45) Date of Patent: *Jul. 8, 2025

(54) APPARATUS AND METHOD FOR PERFORMING SEMI-OCCLUDED VOCAL TRACT EXERCISES

(71) Applicant: Joseph Patrick Lundquist, Volente, TX (US)

(72) Inventor: Joseph Patrick Lundquist, Volente, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,939

(22) Filed: Jul. 3, 2023

(65) Prior Publication Data
US 2023/0414996 A1  Dec. 28, 2023

Related U.S. Application Data

(63) Continuation of application No. 17/083,298, filed on Oct. 29, 2020, now Pat. No. 11,794,072, which is a continuation-in-part of application No. 16/105,174, filed on Aug. 20, 2018, now abandoned.

(60) Provisional application No. 62/927,629, filed on Oct. 29, 2019.

(51) Int. Cl.
*A63B 23/18* (2006.01)
(52) U.S. Cl.
CPC .................... *A63B 23/18* (2013.01)
(58) Field of Classification Search
CPC ...................................................... A63B 23/18
See application file for complete search history.

(56) References Cited

U.S. PATENT DOCUMENTS

| | | | | |
|---|---|---|---|---|
| 2,720,809 A * | 10/1955 | Ozment | ................. | A63B 23/18 84/466 |
| D218,545 S * | 8/1970 | Frost | ............................. | D17/10 |
| 3,558,797 A * | 1/1971 | Wolford | .................... | G10D 7/03 84/384 |
| 3,949,738 A * | 4/1976 | Monroe | ............... | A61B 5/0871 600/538 |
| 4,421,120 A * | 12/1983 | Edwards, Jr. | ........ | A61B 5/0871 600/538 |
| D280,765 S * | 9/1985 | Alvino | ......................... | D24/164 |
| 4,741,240 A * | 5/1988 | Kawano | .................... | G10H 3/00 84/723 |

(Continued)

*Primary Examiner* — Joshua T Kennedy

(57) ABSTRACT

An improved apparatus and method for practicing Semi-Occluded Vocal Tract exercises. The improved apparatus comprises a novel hollow apparatus that enables and enhances semi-occluded vocal tract breathing and vocalizing exercises. A preferable embodiment comprises a hollow air chamber enclosed in an encasing with an air entrance and a plurality of exits. The encasing may be made of metal, rubber, silicone, plastic, or another durable material. The encasing may be rigid or flexible in different embodiments. It may comprise rigid and flexible elements in the same embodiment. In certain embodiments, the encasing comprises a material imbued with or inherently possessing antimicrobial properties such as the oligodynamic effect found in copper, brass, silver, gold, and several other metals and alloys. In preferred embodiments, the air resistance is adjustable. Preferred embodiments comprise elements enabling the apparatus to be worn as a necklace, ring, clip, or other wearable apparatus.

11 Claims, 15 Drawing Sheets

(56) References Cited

U.S. PATENT DOCUMENTS

| | | | | |
|---|---|---|---|---|
| 4,770,413 | A | * | 9/1988 | Green .................... A63B 23/18 |
| | | | | 482/13 |
| D427,228 | S | * | 6/2000 | Light ............................ D17/10 |
| 6,083,141 | A | * | 7/2000 | Hougen ............ A61M 16/0006 |
| | | | | 128/202.16 |
| 6,924,424 | B2 | * | 8/2005 | Sueta, Jr. ................. G10D 7/00 |
| | | | | 84/464 R |
| D682,435 | S | * | 5/2013 | Lowsky, Jr. ................. D24/194 |
| D770,561 | S | * | 11/2016 | Clissold ......................... D17/10 |
| 11,357,938 | B2 | * | 6/2022 | Soma ................ A61M 16/0006 |
| 11,794,072 | B2 | * | 10/2023 | Lundquist .............. G09B 19/00 |
| 2004/0050892 | A1 | * | 3/2004 | Oregon .................... A45F 5/00 |
| | | | | 224/251 |
| 2004/0255754 | A1 | * | 12/2004 | Richter ................. G10D 7/026 |
| | | | | 84/1 |
| 2005/0022652 | A1 | * | 2/2005 | Sueta, Jr. ................. G10D 7/00 |
| | | | | 84/464 A |
| 2006/0178245 | A1 | * | 8/2006 | Schiller .................. A63B 23/18 |
| | | | | 482/13 |
| 2007/0042870 | A1 | * | 2/2007 | Bohman .................. F41B 1/00 |
| | | | | 482/11 |
| 2007/0089740 | A1 | * | 4/2007 | Baumert ........... A61M 16/0488 |
| | | | | 128/200.24 |
| 2015/0224270 | A1 | * | 8/2015 | Frandson ............... A63B 23/18 |
| | | | | 128/204.18 |
| 2016/0375213 | A1 | * | 12/2016 | Zlupko ............. A61M 16/0493 |
| | | | | 128/200.24 |
| 2022/0105387 | A1 | * | 4/2022 | Lundquist .............. A63B 23/18 |
| 2023/0414996 | A1 | * | 12/2023 | Lundquist .............. A63B 23/18 |

* cited by examiner

APPARATUS AND METHOD FOR PERFORMING SEMI-OCCLUDED VOCAL TRACT EXERCISES

CROSS-REFERENCE TO RELATED APPLICATIONS

This application is a continuation of U.S. patent application Ser. No. 17/083,298, filed Aug. 29, 2020, the disclosure of which is hereby incorporated herein by reference in its entirety.

TECHNICAL FIELD OF THE INVENTION

The present invention relates in general to vocal exercise devices, and, more specifically, to an apparatus for semi-occluded vocal tract exercises.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The vocal tract is the cavity in human beings where the sound produced in the larynx is filtered. A training method known as semi-occluded vocal tract (SOVT) training exists, which specifically involves moving air through a partially-closed mouth to stretch and balance the vocal folds while placing less impact and stress on them.

Persons who wish to take advantage of SOVT training often do so by using an ordinary drinking straw or even a coffee stirring straw to allow a small portion of air out of their mouth at a time. This is referred to as straw phonation. It has been studied and demonstrated in scientific journals that by partially occluding the vocal tract in this manner, many desirable benefits are gained. Among these are effects that foster healthy phonation, such as increased inertance of the vocal tract, proper alignment of the vocal tract, correction of breathing techniques, and development of phonation muscle memory.

Increased inertance of the vocal tract is the keeping of air in the vocal tract's contained acoustic system by restricting the ease with which air flows out of the vocal tract, in this case by increased back-pressure. The level of this increase has a direct relationship with the length of the straw or tube used, and has an inverse relationship with the inner diameter of the straw or tube used. Increasing inertance in this manner allows the vocal cords to approach each other in a more controlled, balanced, and easy way, increasing vibration efficiency and loudness, and improving acoustic focus.

In an attempt to find the most effective diameter for straw phonation, studies have been undertaken on the returned air pressure generated across various straw types, relative to the air pressure sent through different straw sizes and types, for example coffee stirring straws, cocktail straws, drinking straws. Results of the studies have revealed that, in a closed vocal tract system with the only air exit being through the straw, the increase in back pressure between the mouth and the larynx is directly proportional to the air pressure pushed upward through the larynx from the lungs below. The resistance offered by a straw to generate this back pressure can be manipulated by varying the length and diameter of the straw. But, the optimal resistance required for the effective exercise may vary from person to person and, also, from occasion to occasion for each person. A reason for this may be the natural variations in physiology from one person to another. Also, one vocalist may have different needs or preferences at different time and the needs can also be different for different vocalists.

The prevailing understanding is that optimal straw inner diameter falls between 2 mm and 4 mm for most people. Over 4 mm diameter becomes ineffective in providing enough resistance for most people, and diameter below 2 mm becomes ineffective in that it provides too much resistance for most people. There are outlier users who do need and/or prefer resistance levels such as those provided by wider or narrower diameters. For example, a person may have a vocal injury or may be recovering from a vocal surgery. In this case, a doctor or speech language pathologist may suggest a wider diameter such as 4.5 mm-6 mm. A person with a proclivity to generate above-average pressure while singing may gain benefits from SOVT exercises with a tube narrower than 2 mm, such as a very small 1 mm tube.

As such, a need exists for a single apparatus which can meet the above-mentioned different requirements for performing semi-occluded vocal tract exercises.

OBJECTS OF THE INVENTION

To minimize the limitations in the prior art, and to minimize other limitations that will be apparent upon reading and understanding the present specification, the present invention describes an apparatus for semi-occluded vocal tract exercises.

It is an object of the present invention to provide an apparatus for semi-occluded vocal tract exercises that may comprise a hollow tube.

It is another object of the present invention to provide an apparatus for semi-occluded vocal tract exercises that may comprise a resilient material.

It is another object of the present invention to provide an apparatus for semi-occluded vocal tract exercises that may comprise a rigid material.

It is another object of the present invention to provide an apparatus for semi-occluded vocal tract exercises that may comprise a flexible material.

It is another object of the present invention to provide an apparatus for semi-occluded vocal tract exercises that may comprise antimicrobial properties.

It is another object of the present invention to provide an apparatus for semi-occluded vocal tract exercises that may comprise a wearable device.

Yet another object of the present invention is to provide an apparatus for semi-occluded vocal tract exercises capable of offering variable resistance.

These and other advantages and features of the present invention are described herein with specificity so as to make the present invention understandable to one of ordinary skill in the art, both with respect to how to practice the present invention and how to make the present invention.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to an apparatus and method for semi-occluded vocal tract exercises. The apparatus comprises an elongated body having a proximal end and a distal end. The proximal end is made suitable for holding between the lips of a user. An inlet configured to receive air blown from the mouth of a user is disposed at the proximal end. An exit is disposed opposite to the inlet at the distal end of the elongated body. An interior wall of the elongated body defines a central lumen or passage or channel that extends from the inlet to the exit. One or more apertures of uniform or non-uniform dimensions are disposed over the elongated body longitudinally and/or axially. The central lumen puts the apertures and the exit in fluid communication with the inlet. In one embodiment, the central lumen has a circular cross-section which is configured to decrease gradually from the inlet to the exit. It is known that resistance to fluid flow depends on cross-sectional area of the channel/lumen and the length of the channel/lumen. For apparatus of the present invention, the apertures are located at different distances from the entry and the diameters of the central lumen where the apertures are located are also different from each other. Therefore, air passing through every aperture faces different resistance and the user can adjust the resistance to the required level by selectively blocking one or more apertures and/or the exit with fingers. Thus, the same apparatus of the present invention can offer a wide range of variable resistance for semi-occluded vocal tract exercises as per the need of a user at different air flow rates.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper", "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The present invention relates in general to vocal exercise devices, and, more specifically, to an apparatus for semi-occluded vocal tract exercises. As contemplated by the present invention, the term "vocal straw" may be used to describe the device, as the preferred embodiment is meant to resemble a simple drinking straw, which the invention replaces. The present invention may be made available in any appropriate shape, though, namely oval, rectangular, star-shaped, or other formed shapes.

Figure 1:
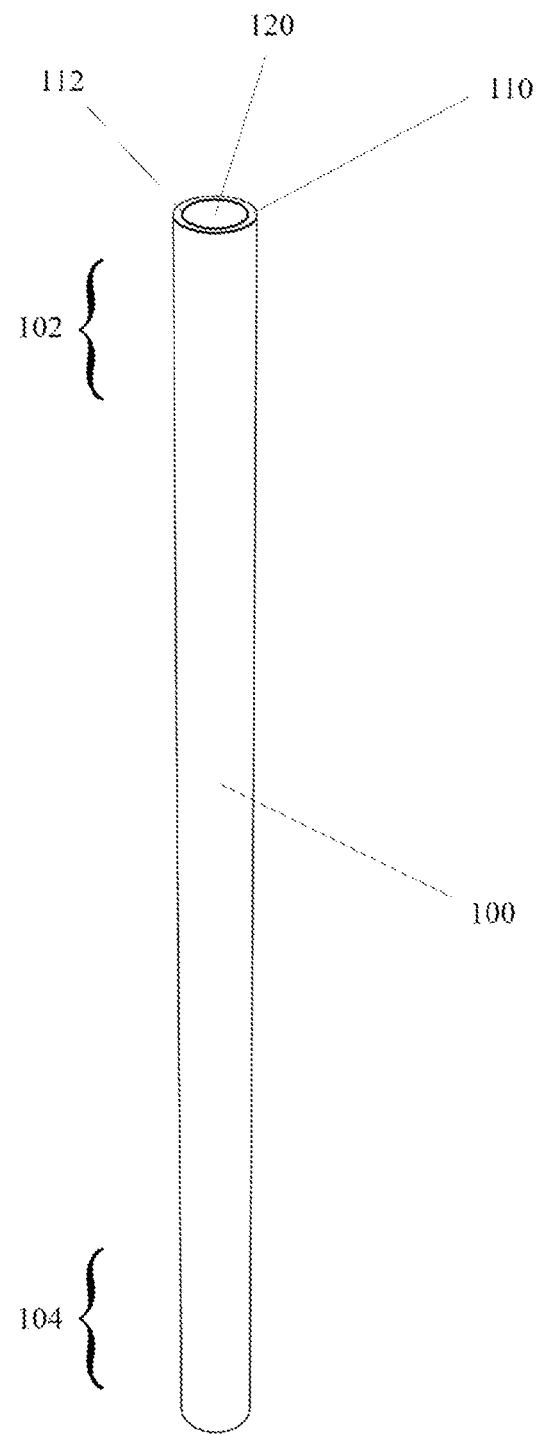
FIG. 1 illustrates a first embodiment of an apparatus for semi-occluded vocal tract exercises from a side perspective.
Figure 2:
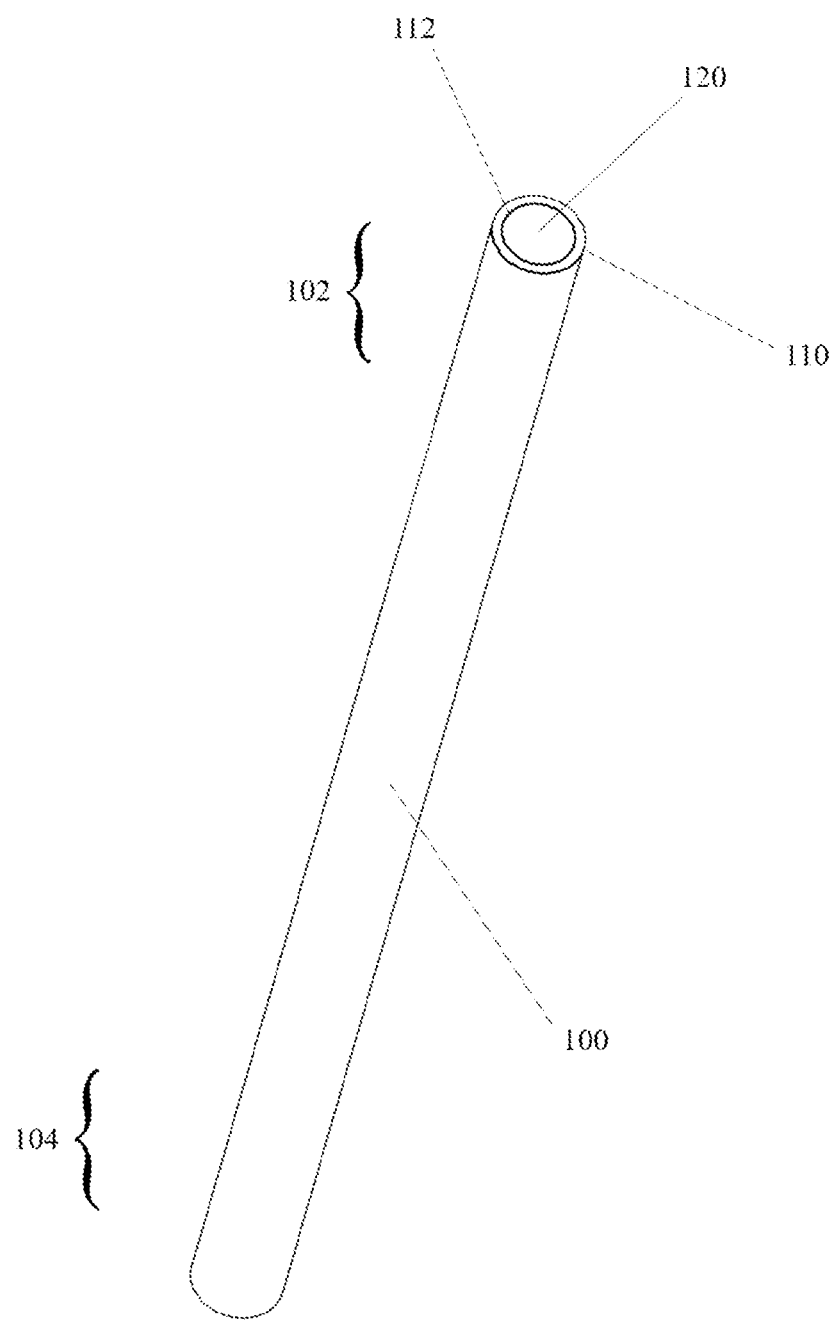
FIG. 2 illustrates a first embodiment of an apparatus for semi-occluded vocal tract exercises from a side three-quarters perspective.
Figure 3:
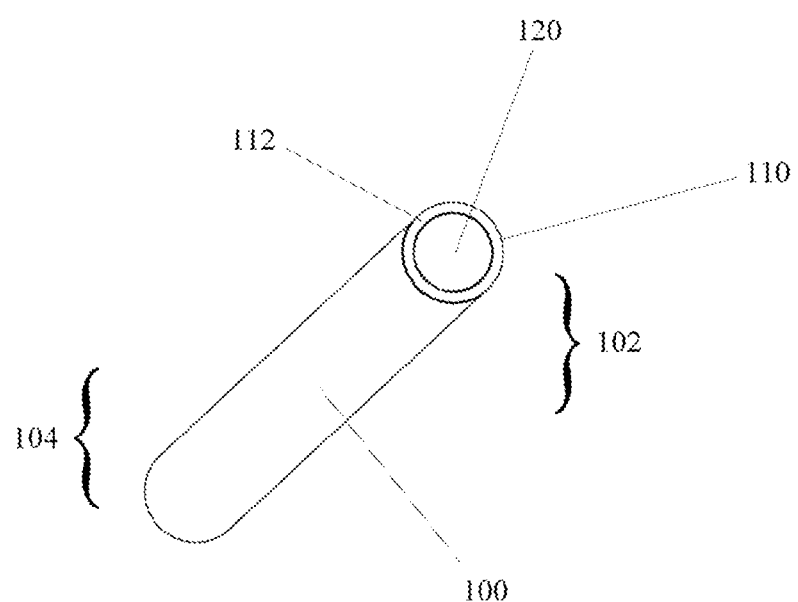
FIG. 3 illustrates a first embodiment of an apparatus for semi-occluded vocal tract exercises from a top three-quarters perspective.

FIGS. 1 through 3 illustrate a first embodiment of an apparatus for semi-occluded vocal tract exercises, as contemplated by the present invention. The figures identify a main body 100 having a first end 102 and a second end 104. The main body 100 comprises a substantially tubular shape having an outer diameter 110, an inner diameter 112, and forming a central lumen 120.

The present invention comprises a novel hollow apparatus that enables and enhances semi-occluded vocal tract breathing and vocalizing exercises. A preferable embodiment comprises a hollow tube. The main body may be made of any appropriate material, though preferably comprises a resilient material so as to be durable in order to withstand regular and continued use. By way of example, the tube may comprise a material of construction of copper, aluminum, steel, brass, silver, gold, carbon fiber, fiberglass, or any combination thereof.

In an alternative embodiment the present invention may comprise a flexible material such as silicone for construction so as to be made collapsible or so that it may be rolled up for portability. In certain embodiments, the material of construction either comprises a material having antimicrobial properties or comprises a layering of antimicrobial material or coating. Antimicrobial properties comprise antibacterial, biocidal, microbicidal, anti-fungal, anti-viral, or others. One such antimicrobial property is the oligodynamic effect, which is possessed by copper, brass, silver, gold, and several other metals and alloys.

The incorporation of antimicrobial properties is an important aspect to this invention. Copper and its alloys in particular have exceptional self-sanitizing effects. Silver also has this effect, and is less toxic to humans than copper. Some materials, such as silver in its metallic form, may require the presence of moisture to activate antimicrobial properties.

In preferred embodiments, the apparatus would have an inner diameter between 2 mm and 4 mm. Given that vocal tract inertance is inversely proportional to the inner diameter of a straw, the smaller the diameter, the more difficult it is to move air through it. When a person has a naturally smaller vocal tract relative to the average person, or they have a smaller volume of air that typically is expelled when vocalizing, relative to the average person, they may prefer a larger inner diameter for a vocal straw. This is the opposite for a person with larger than average vocal tract or volume of air expelled when vocalizing, which person may prefer the greater resistance provided by a smaller inner diameter.

In certain embodiments, the vocal straw might be approximately 76.2 mm long, with an inner diameter between 2.3 mm and 3.5 mm because this is a small enough opening that it provides needed resistance for those with relatively strong exhaling ability to gain the desired effects of SOVT exercises. At the same time, it is large enough so as to not prohibit those with relatively less exhaling ability from effectively using the straw for SOVT exercises. The 76.2 mm length is an excellent size for portability. Furthermore, because some materials including silver require moisture for active antimicrobial effect, the anaerobic nature of narrow tubing is beneficial to the antimicrobial function of the invention, allowing moisture from saliva and condensation to remain in the tube.

Figure 4C:
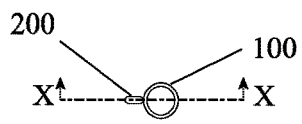
FIGS. 4A to 4F illustrate different views of a second embodiment of an apparatus for semi-occluded vocal tract exercises.
Figure 4B:
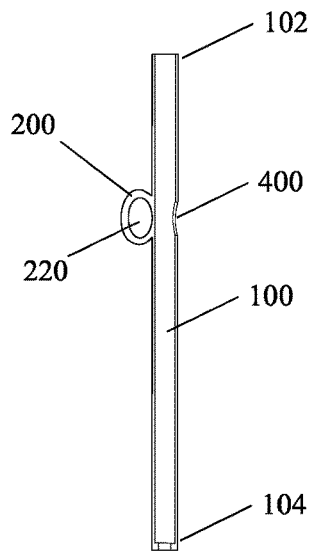
Figure 4A:
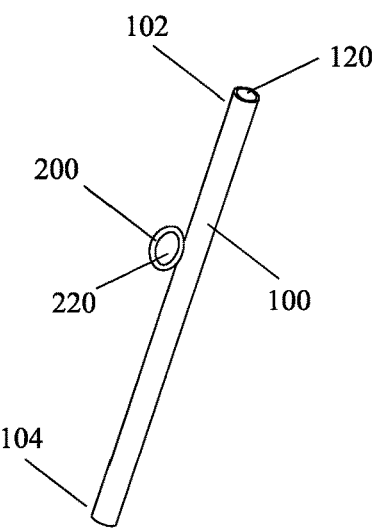
Figure 4E:
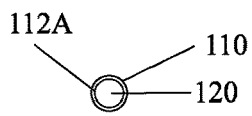
Figure 4D:
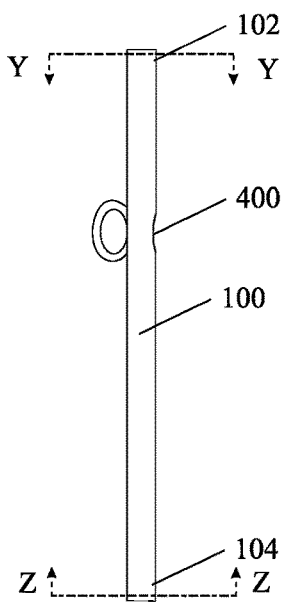
Figure 4F:
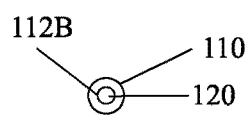
Figure 5:
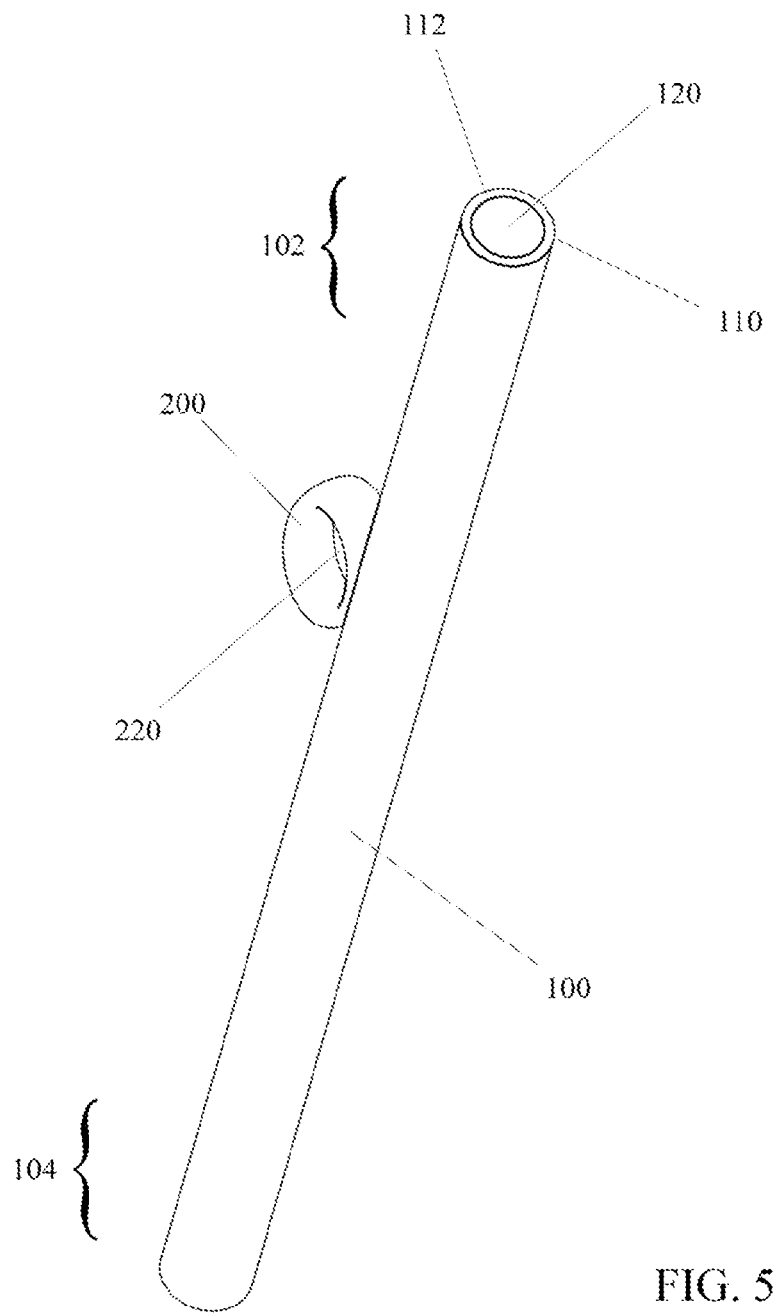
FIG. 5 illustrates a second embodiment of an apparatus for semi-occluded vocal tract exercises from a side three-quarters perspective.
Figure 6:
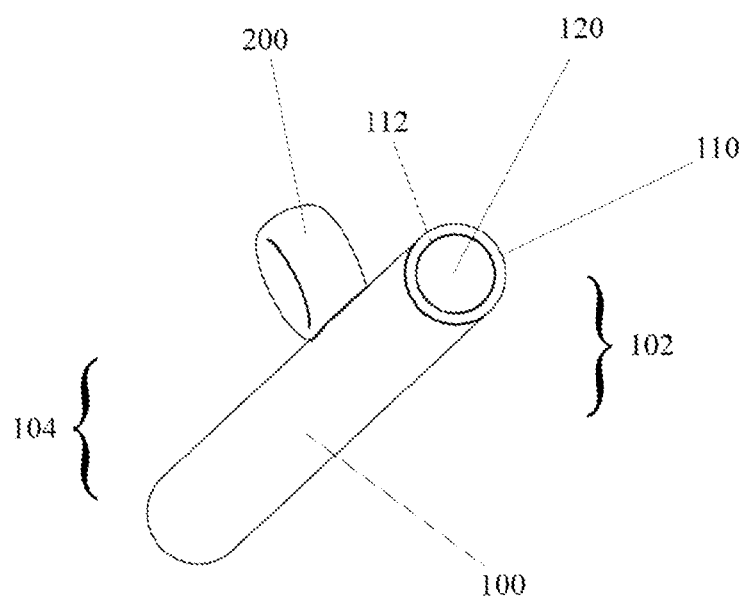
FIG. 6 illustrates a second embodiment of an apparatus for semi-occluded vocal tract exercises from a top three-quarters perspective.
Figure 7:
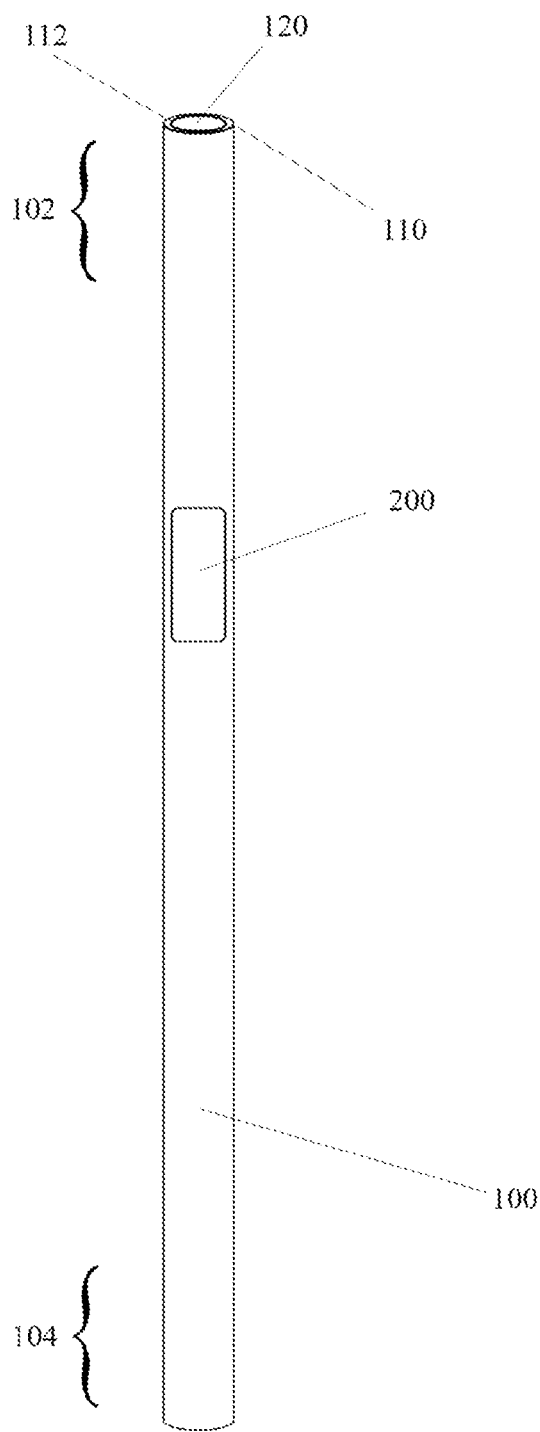
FIG. 7 illustrates a second embodiment of an apparatus for semi-occluded vocal tract exercises from a rear perspective.

In certain embodiments the overall structure of the device may comprise a shape that is non-tubular, though a tubular air flow channel may be enveloped within the shape itself. In such embodiments the shape may comprise an air inlet and exit substantially opposed to one another. By way of example, if the main body is shaped as a sphere or disc, the air inlet may be at one end and the air exit may be located 180 degrees opposite to the air inlet. An air tube may connect the air inlet and exit through the main body. In another example, if the main body is shaped as a star the air inlet may be at one point while the air exit may be at any one or more other points. The air channel connecting the inlet and exits may or may not be a straight channel, and may comprise various diameters that may be selectively blocked so that a user may manually adjust the resistance to air flow. For example, as shown in FIGS. 4E and 4F, the first end 102 may have an inner diameter 112A bigger than the inner diameter 112B of the central lumen 120 at the second end 104. Similarly, the inner diameter of the central lumen at the second air exit 400 disposed on the main body 100 and connected to the central lumen 120 between the first end 102 and the second end 104 is different from the inner diameter of the air exit of the central lumen disposed at the second end 104. A user may selectively block the air exits (second air exit 400 or the first air exit at the second end 104) to manually adjust the resistance offered to the flow of air in the central lumen 120. FIG. 4B illustrates a sectional view of the apparatus of FIG. 4A taken along the line X-X shown in the longitudinal end view of FIG. 4C. FIG. 4E and FIG. 4F depict the sectional view of the first end 102 and the second end 104 taken along the lines Y-Y and Z-Z respectively shown in FIG. 4D.

In all embodiments it is contemplated that the device may have an adjustable length or an adjustable air channel diameter or resistance. A single user may have need for varying air flow resistances based on individual training or need, and so a single device may be able to suit these varying needs for the individual user. In the alternative, multiple users may have differing air flow resistance needs, and so a single device design may be usable by users of varying needs.

FIGS. 4 through 7 illustrate a second embodiment of an apparatus for semi-occluded vocal tract exercises, as contemplated by the present invention. The figures identify a main body 100 having a first end 102 and a second end 104. The main body 100 comprises a substantially tubular shape having an outer diameter 110, an inner diameter 112, and forming a central lumen 120. Further illustrated is a means for suspending 200 having a central opening 220.

In certain embodiments of the present invention, the tube is incorporated into a wearable item such as a necklace. A bail may be soldered onto the vocal straw, or perhaps the entire apparatus is cast or 3D-printed, or is constructed by some other appropriate means. In one embodiment, the means for suspending 200 would enable the vocal straw to be suspended on a necklace by passing it through the central opening 220. In another embodiment with perhaps a different size means for suspending 200, the vocal straw could be held easily by or worn on a finger or fingers. The loop could also be rotated on its axis or duplicated in certain embodiments.

Figure 8:
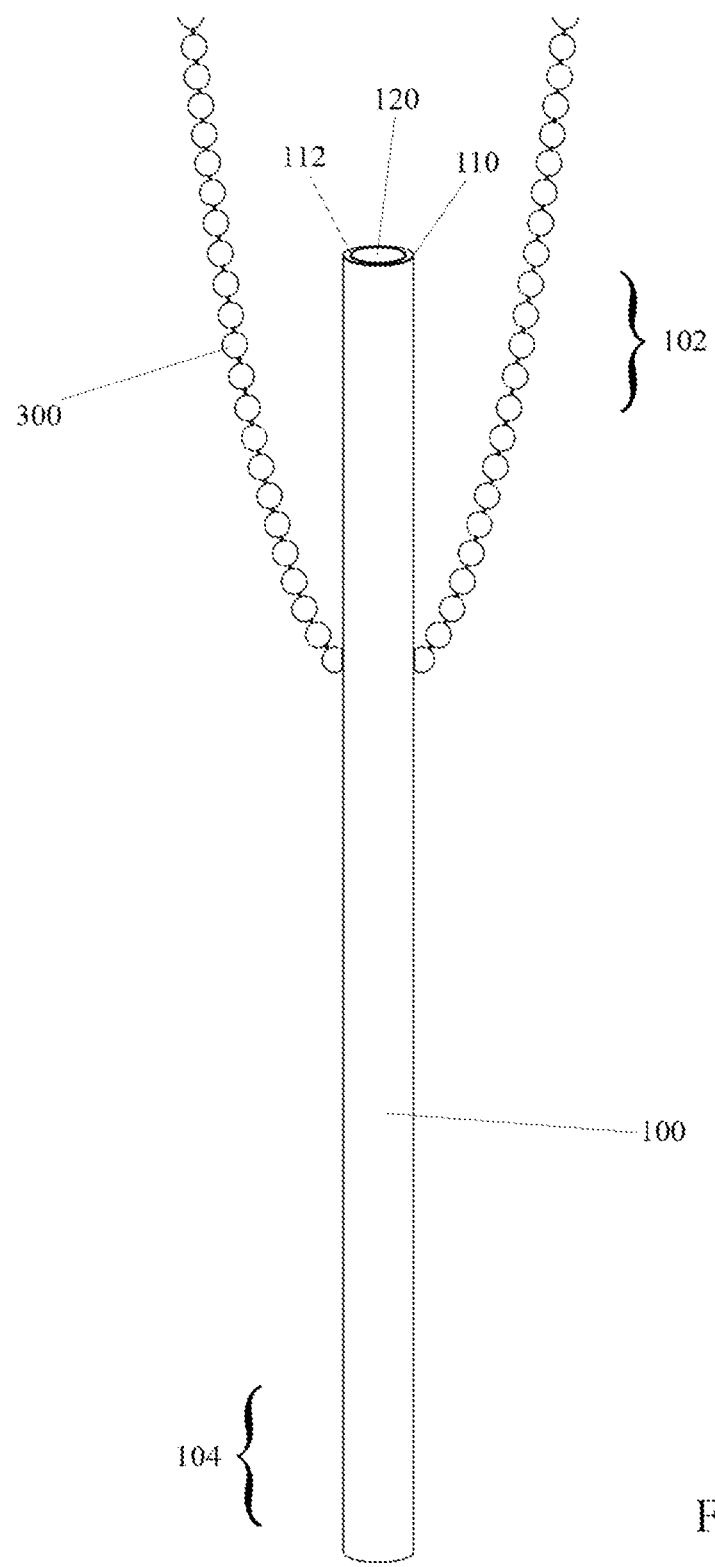
FIG. 8 illustrates a third embodiment of an apparatus for semi-occluded vocal tract exercises from a front perspective.
Figure 9:
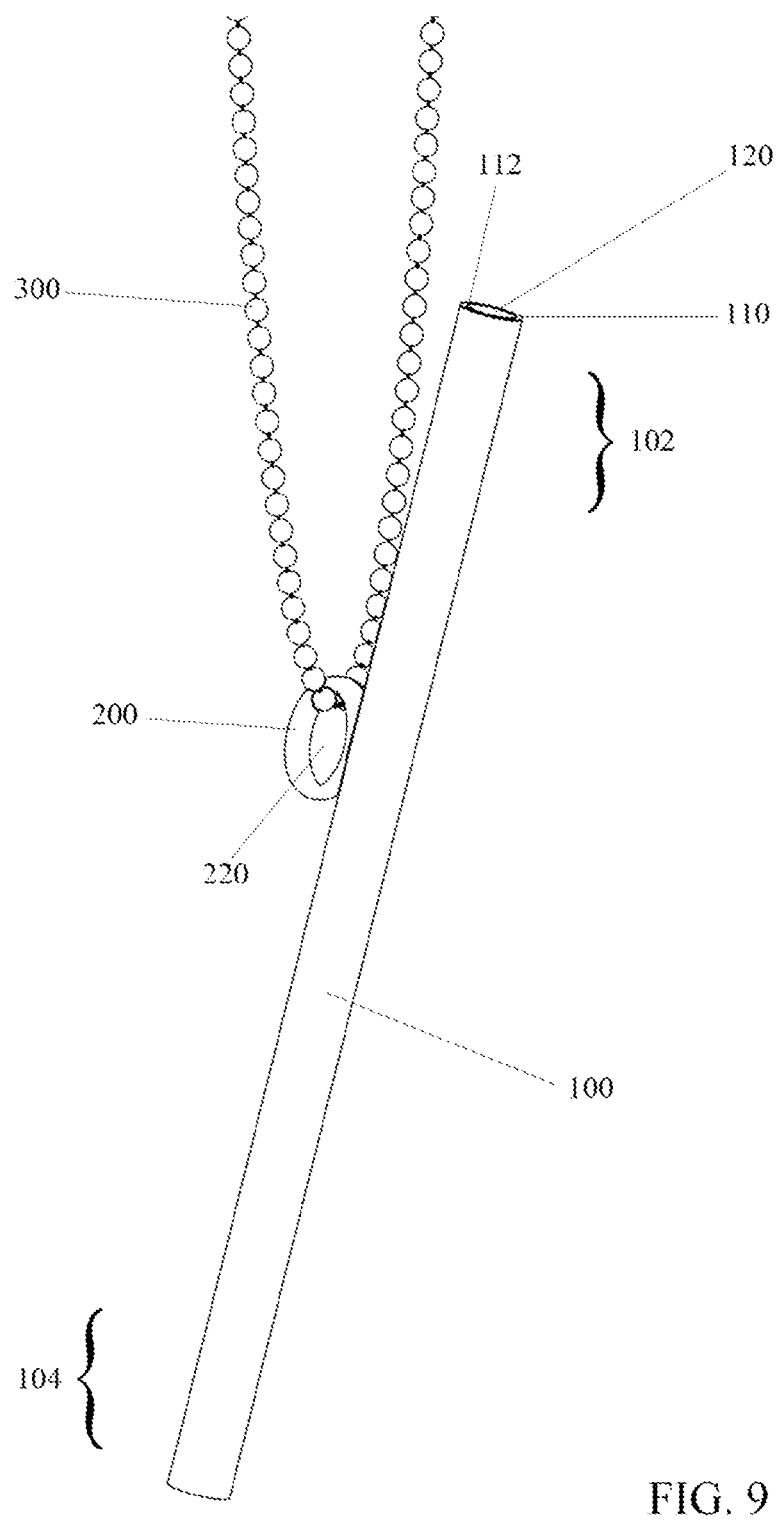
FIG. 9 illustrates a third embodiment of an apparatus for semi-occluded vocal tract exercises from a side three-quarters perspective.
Figure 10:
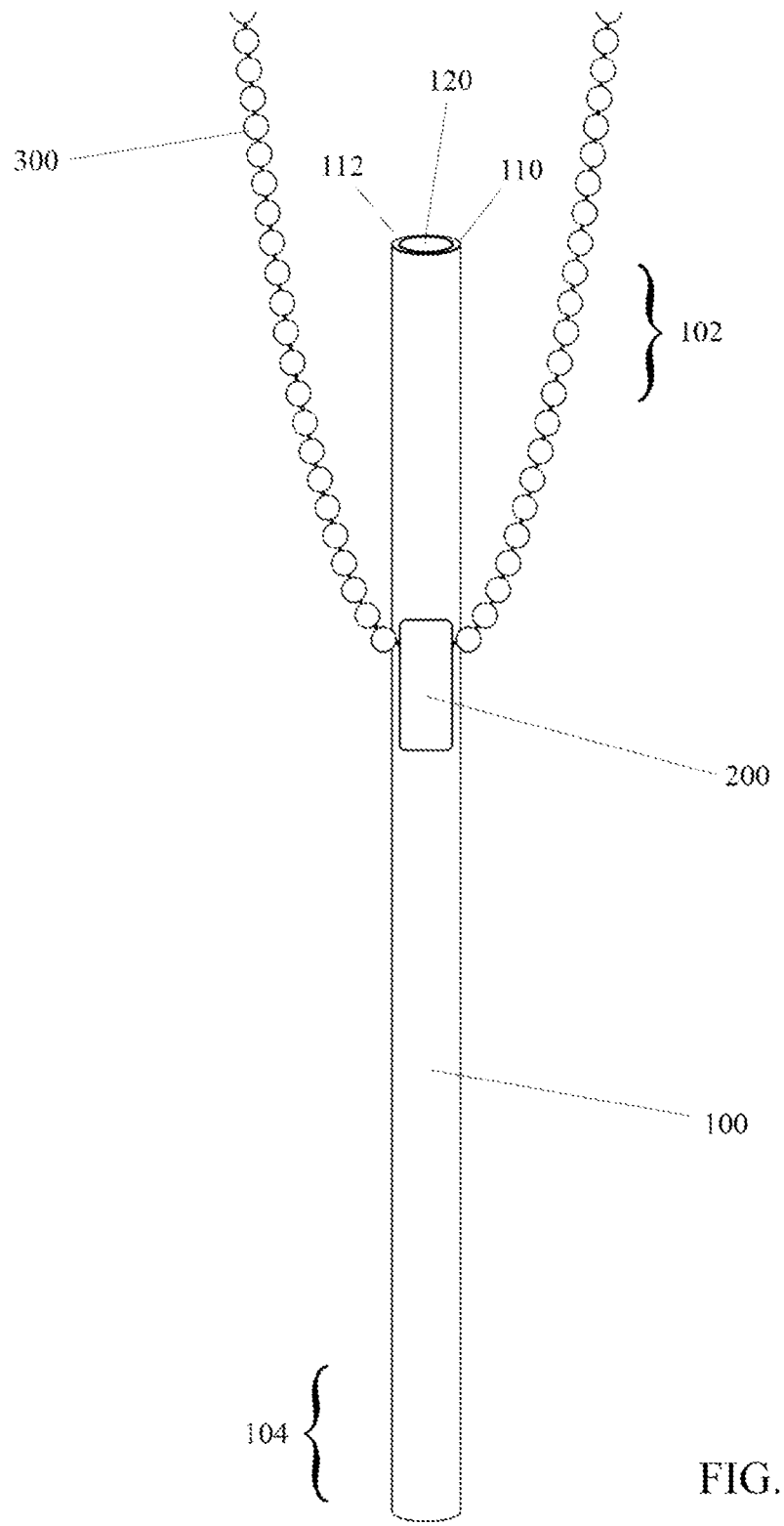
FIG. 10 illustrates a third embodiment of an apparatus for semi-occluded vocal tract exercises from a rear perspective.

FIGS. 8 through 10 illustrate a third embodiment of an apparatus for semi-occluded vocal tract exercises, as contemplated by the present invention. The figures identify a main body 100 having a first end 102 and a second end 104. The main body 100 comprises a substantially tubular shape having an outer diameter 110, an inner diameter 112, and forming a central lumen 120. Further illustrated are a means for suspending 200, having a central opening 220, and a means for wearing 300.

In a preferred embodiment the means for wearing 300 is a necklace, chain, rope, or any other suitable means for engaging a user. In some embodiments, the vocal straw is used as an instrument that facilitates a distinct timbre in the voice. In some embodiments it may be used as a vocal warm-up tool, wherein the means for suspension 200 may engage a user's finger. The vocal straw may be used for acute vocal therapy or for ongoing vocal health maintenance. The vocal straw may also be used as a noise-dampening device, which is particularly beneficial in environments where a user is in close proximity to others, such as in a city or apartment. In certain embodiments, the invention may be used without vocalization. An example of this would be a reed instrumentalist using the invention for breathing exercises to train in economy of breath.

In some embodiments, the means for suspending 200 may possess one or more inner concentric loops that facilitate the spinning of the vocal straw around the axis of the concentric loops. In another embodiment, magnets, weights, bearings or lubricants may be incorporated to facilitate such spinning.

In a preferred embodiment the device may further incorporate a means for attachment. Such a means for attachment may comprise a clip, a clasp, a magnet, or any other appropriate means. A clip or a clasp, for example, may provide the ability to attach the vocal straw to a piece of clothing, a piece of paper, or other items. The use of a magnet, or the use of a magnetic material of construction, may allow the device to attach magnetically to another item for easy storage or for other purposes.

In certain embodiments, the apparatus may be molded in such a way as to be easily held. It may also be incorporated into a larger apparatus which features an ergonomic design.

It is evident that the effectiveness of semi-occluded vocal tract breathing and vocalizing exercises depends on the ability of the device to offer right amount of resistance against the flow of air at a specific flow rate. Again, the optimal range of resistance required for every user and every occasion is different. The conventional straws and tubes used for semi-occluded vocal tract exercises offer different resistance in accordance with the internal diameter and length of the item used. For example, tubes with diameters in the range of 2 mm to 4 mm and lengths in the range of 11.5 cm to 19.7 cm return a minimum of 6 kilopascals of back pressure at a flow rate of 0.6 liters of air per second. In contrast, tubes in the range usually categorized as drinking straws, with diameters between 6.0 mm and 6.7 mm and lengths between 19.5 cm and 19.4 cm respectively, do not achieve 5 kilopascals of pressure at twice the flow rate, 1.2 liters per second. The device of the present invention allows users to select a range of back pressure at various air flow rates.

FIGS. 11A to 11E illustrate a fourth embodiment of the apparatus for semi-occluded vocal tract exercises. In this embodiment, the apparatus for semi-occluded vocal tract exercises 1100 is configured to be held by the hand, and more specifically by the fingers, of a user. The apparatus 1100, as shown in a front view in FIG. 11A, comprises an elongated body 1102 having a proximal end 1104 and a distal end 1106 located opposite to the proximal end 1104.

Figure 11E:
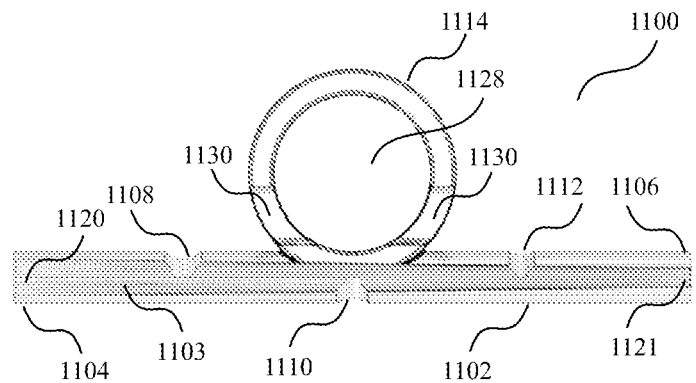
FIG. 11A-11E illustrate different views of a fourth embodiment of an apparatus for semi-occluded vocal tract exercises.
Figure 11D:
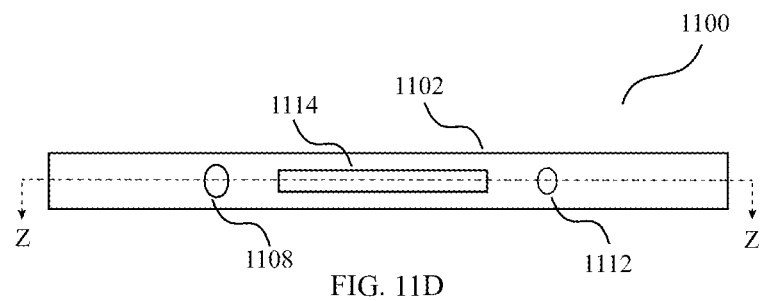
Figures 11A, 11B, 11C:
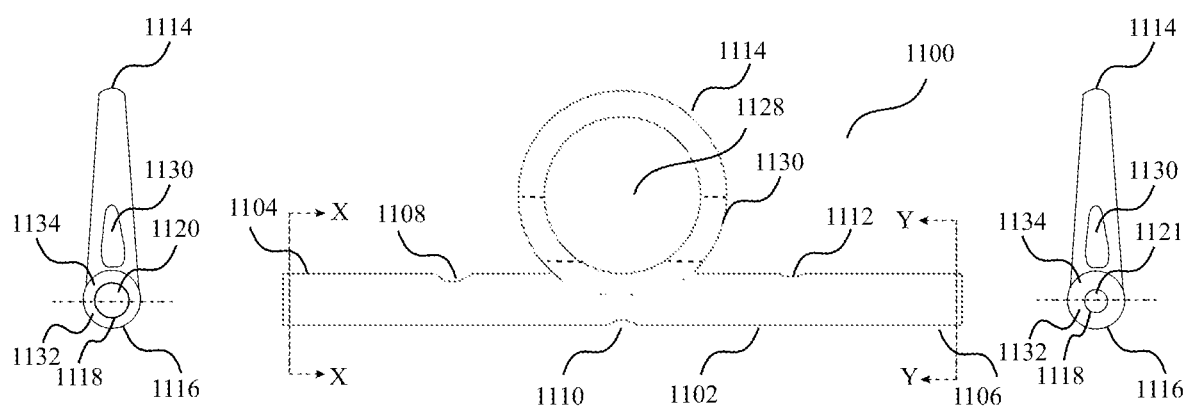

Reference to FIG. 11B and FIG. 11C, the elongated body 1102 has an exterior wall 1116 and an interior wall 1118 as shown in the sectional views of the proximal end 1104 and distal end 1106 taken along the lines X-X and Y-Y respectively shown in the front view of the apparatus 1100 in FIG. 11A. The interior wall 1118 defines a central lumen 1103 as shown in the sectional view of the apparatus in FIG. 11E taken along the line Z-Z shown in FIG. 11D. The central lumen 1103, as shown in FIG. 11E, extends between an inlet 1120 disposed at the proximal end 1104 and an exit 1121 disposed at the distal end 1106 bringing the inlet 1120 and the exit 1121 in fluid communication with each other.

The proximal end 1104 is dimensioned to be suitable for holding between the lips of a user and is configured to receive air blown from the mouth of the user through an inlet 1120 disposed at the proximal end 1104. An exit 1121, disposed at the distal end 1106, is configured to permit exit of the air through the distal end 1106. In a preferred embodiment, the central lumen 1103 has a circular cross section. The diameter and, thus, the cross-sectional area of the central lumen can be made to reduce gradually so that the central lumen tapers toward the exit 1121 as shown in FIG. 11E. In some embodiments, the diameter of the central lumen 1103 can be stepped-down in non-gradual manner. In either way, the exit 1121 is made smaller in area than the inlet 1120 as shown in FIGS. 11B and 11C respectively. The exterior wall 1116 may run parallel to the interior wall 1118 along the entire length of the elongated body 1102 or it may maintain the same cross-sectional dimension it has at the proximal end 1104 till the distal end 1106 or the outer periphery of the elongated body may have a cross-section different from that of the central lumen.

The elongated body 1102 further comprises one or more apertures 1108, 1110, 1112 etc. as shown in FIGS. 11A, 11D and 11E. The apertures extend from the exterior wall 1116 to the interior wall 1118 and terminate inside the central lumen 1103. In a preferred embodiment, apertures of different sizes are linearly positioned and uniformly spaced apart along the length of the elongated body 1102. In other embodiments, the apertures can be positioned at different locations of the elongated body and, also, can be of different dimensions. For example, the apertures may be aligned in rows that extend from the proximal end 1104 to the distal end 1106 and the rows may only extend for a portion of the length of the elongated body. In a preferred embodiment, as shown in FIGS. 11A, 11B, 11C and 11E, one of the plurality of apertures (aperture 1110 in this example) is located on a first lateral side 1132 of the elongated body 1102 whereas the rest of the apertures (apertures 1108 and 1112 in this example) are disposed on the second later side 1134 which faces a direction substantially opposite to the first lateral side 1132. With the elongated body 1102 secured by one of the fingers using the securement loop 1114 affixed to the second lateral side 1134 as shown in FIGS. 11A-11E, aperture 1110 can be blocked by the thumb of the user without requiring the user to change hand position or without needing any help from the other hand.

Figure 12C:
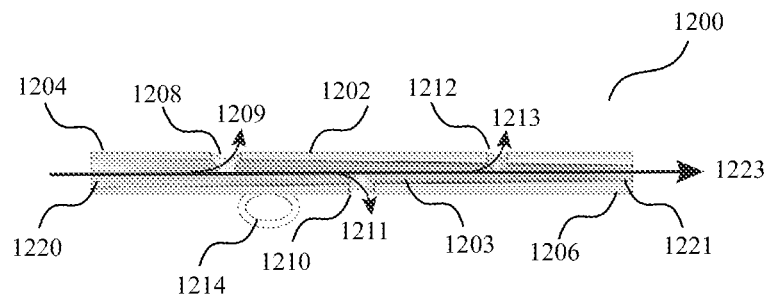
FIG. 12A-12C illustrate different views of a fifth embodiment of an apparatus for semi-occluded vocal tract exercises.
Figure 12B:
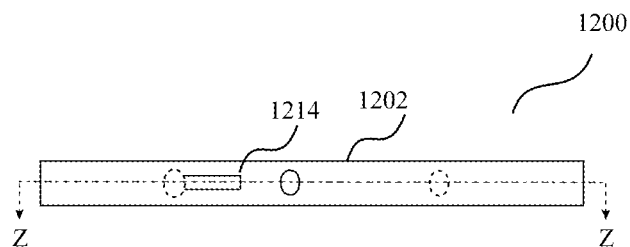
Figure 12A:
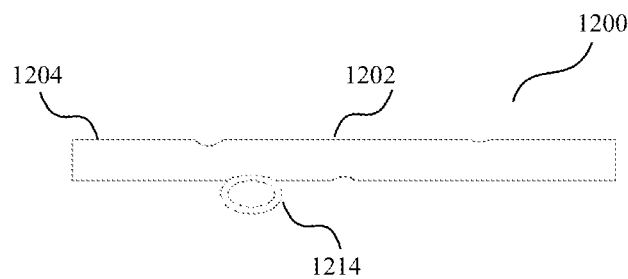
Figure 13E:
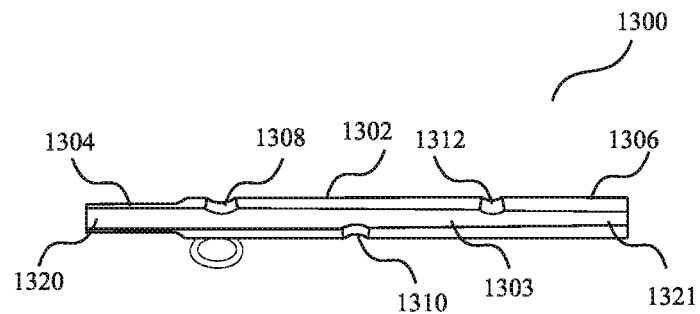
FIG. 13A-13E illustrate different views of a sixth embodiment of an apparatus for semi-occluded vocal tract exercises.
Figure 13D:
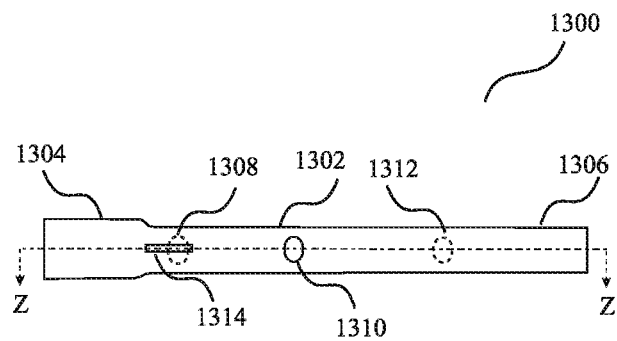
Figures 13A, 13B, 13C:
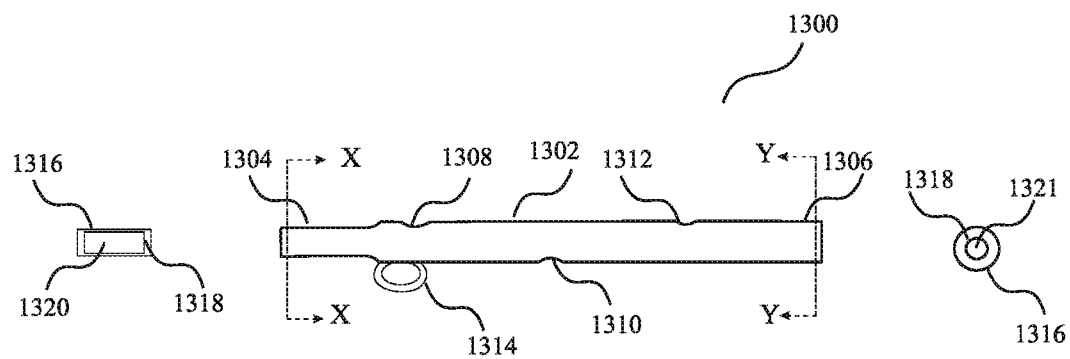
Figure 15A:
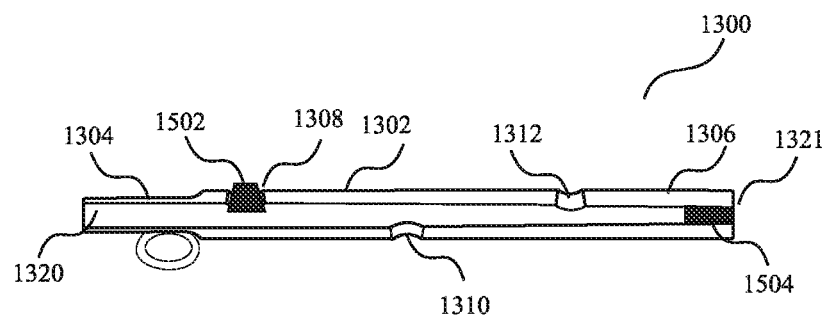
FIG. 15A illustrates the apparatus for semi-occluded vocal tract exercises with plugs/pegs inserted in accordance with an embodiment.
Figure 15B:
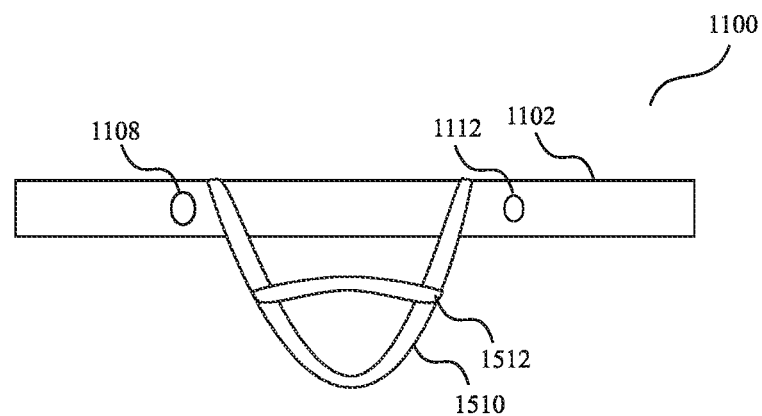
FIG. 15B illustrates the apparatus for semi-occluded vocal tract exercises with a securement arrangement affixed in accordance with an embodiment.

The securement arrangement or securement loop 1214 of embodiment 1200 of FIG. 12A or the securement loops 1114 and 1314 of embodiments 1100 of FIG. 11A and 1300 of FIG. 13A respectively can all be made adjustable in size. For example, one size of the securement loop can be made to allow a user to easily hold and/or wear the apparatus as a ring, or to pass a necklace through loop so that the apparatus can be worn as a pendant with a necklace around the user's neck. Reference to FIGS. 11A, 11B, 11C and 11E, the rigid circular securement loop 1114 comprises an opening 1128 configured to receive a finger of a user such that the finger is secured over the exterior wall 1116 i.e. the finger holds the elongated body 1102. A through hole 1130 is disposed along an axis intersecting the circular securement loop 1114 at two different points. This through hole 1130 is configured to let a cord pass through it so that the device can be suspended from the neck of the user while still allowing the opening 1128 to receive a finger of the user. In certain embodiments, the securement loop may be positioned on a different location on the apparatus, such that the apparatus may lean when suspended, and/or hang entirely vertically. For example, in embodiment 1200 of FIG. 12A, the securement loop 1214 is disposed closer to the proximal end 1204 of the elongated body 1202 whereas, in embodiment 1100 of FIG. 11A, the securement loop 1114 is positioned at the middle of the elongated body 1102. The fifth embodiment 1200, as shown in FIG. 12A, is different from embodiment 1100 of FIG. 11A only in terms of the position of the securement loop 1214. In another embodiment, as shown in FIG. 15B, the securement loop 1510 can be configured as an adjustable sling mechanism for users to hold or wear on a finger. In a preferred embodiment, this securement loop 1510 may be made of silicone and it can further comprise a piece of padding 1512. This piece of padding may be enlarged and/or duplicated and/or repositioned to protect one or more fingers when worn and/or held.

In some embodiments, cross-section of the central lumen may not remain same in shape/dimension throughout its length and may also vary at the proximal and distal ends. In a sixth embodiment 1300 of the present invention, as shown in FIGS. 13A to 13E, the exterior wall 1316 and the interior wall 1318 of the elongated body 1302 may cooperate to define a flattened proximal end of substantially rectangular cross-section. The flattened proximal end 1304 provides broader flat surface for the lips of a user to rest on. In such embodiments, the central lumen 1303 begins to taper toward the exit 1321 from the end of the flattened proximal end 1304 only. In this embodiment, exit 1321 and the distal end 1306 is circular in cross-section whereas the inlet 1320 has a substantially rectangular cross-section. A central lumen with a cross-section of shape that tapers from rectangular to circular as described above would allow for a maximum ratio of air channel to external periphery at the proximal end and minimum ratio of air channel to external periphery at the other end. In some other embodiments, the flattened portion may be disposed anywhere between the proximal and distal ends and such a positioning of the flat portion may help a person to hold the apparatus while using. In all such embodiments, except the flattened portion, rest of the features such as apertures 1308, 1310, 1312 and the central lumen 1303 are same in structure and functionality as that of embodiment 1100 of FIG. 11A.

Figure 14A:
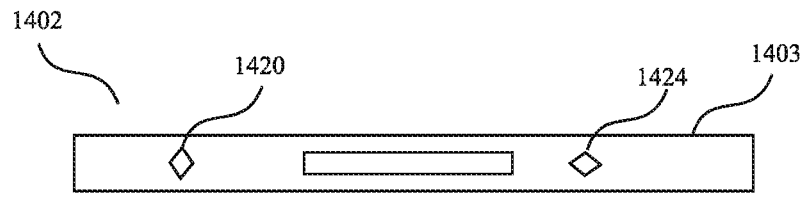
FIG. 14A-14C illustrate the fourth, fifth and sixth embodiments of the apparatus for semi-occluded vocal tract exercises comprising non-circular apertures.
Figure 14B:
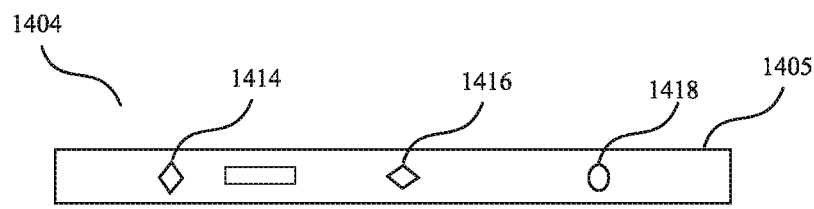
Figure 14C:
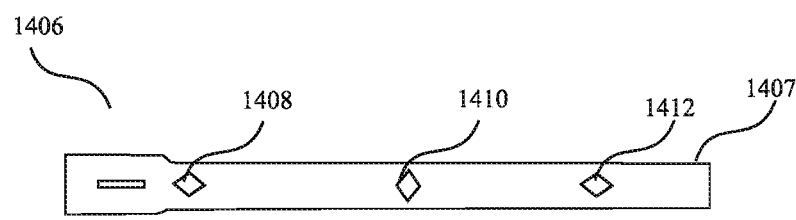
Figure 14D:
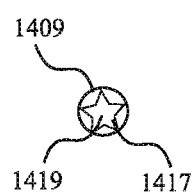
FIG. 14D-14E illustrate exemplary non-circular cross-section of a central lumen of the apparatus for semi-occluded vocal tract exercises.
Figure 14E:
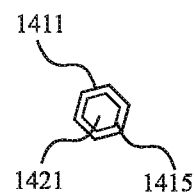

The central lumen and the apertures may be configured to be of different dimensions and sizes in different embodiments. FIGS. 14A-14E illustrate some of such exemplary dimensions. Embodiment 1402 of FIG. 14A is essentially the same as embodiment 1100 of FIG. 11D with the exception of the aperture dimensions. In embodiment 1402 of FIG. 14A, the apertures 1420 and 1424 are non-circular in dimensions. The apertures 1420 and 1424 are quadrilateral (like a rhombus) in shape and their orientations with respect to the longitudinal axis of the elongated body 1403 are also different from each other. In embodiment 1404 of FIG. 14B also, which is similar to embodiment 1200 of FIG. 12B, the apertures 1414 and 1416 are diamond like quadrilaterals arranged in different orientations with respect to the longitudinal axis of the elongated body 1405 whereas aperture 1418 is circular in cross-section. Again, embodiment 1406 of FIG. 14C is similar to embodiment 1300 of FIG. 13D with the exceptions of the apertures 1408, 1410 and 1412 being non-circular in embodiment 1406 with respect to the longitudinal axis of the elongated body 1407. The central lumen may also be configured to have different cross-sectional dimensions apart from having a round or circular cross-section. Similarly, the inlet or exit of the elongated body can also have cross-sectional area of different shapes/dimensions. For example, any of the embodiments can have a star-shaped cross-section similar to cross-section 1419 defined by the interior wall 1417 while having a circular outer periphery defined by the exterior wall 1409 as shown in FIG. 14D. The cross-section of the central lumen/inlet/exit can also be dimensioned to be polygonal similar to cross-section 1421 defined by the interior wall 1415 as shown in FIG. 14E. In FIG. 14E, the outer periphery of the elongated body is also polygonal in cross-section as defined by the exterior wall 1411. In all such embodiments, the area of the non-circular apertures or the lumen/entry/exit may be kept equivalent to the areas of circular cross-sectioned parts. For example, if aperture 1108 of FIG. 11D has a diameter of 3 mm, then the area of that aperture is approximately 7.07 mm$^2$. A quadrilateral aperture such as 1420 of FIG. 14A can also be dimensioned to have an equivalent area of 7.08 mm$^2$ with diagonal dimensions of 4.8 mm and 2.95 mm. Thus, similar resistance to air flow can be achieved by having equivalent cross-sectional area even if the shapes are made different for the central lumen/inlet/exit or for the apertures. A non-circular shape such as a rhombus shape, as opposed to a circular shape, increases the surface area over which air flows as it passes by and through an aperture. In this way it lowers the potential energy of the exiting air which could have resulted in generation of whistling tone due to vibration.

In the apparatus for semi-occluded vocal tract exercises of the present invention, the air entering through the inlet makes way to outside through several ways—through the apertures as well as through the exit disposed at the distal end. For example, in embodiment 1200 shown in FIG. 12C there are four flow paths 1209, 1211, 1213 and 1223 through which the air entering from the inlet 1220 leaves the central lumen 1203.

As per the laws of fluid dynamics, flow resistance depends on many factors, cross-sectional area of the flow passage/path and the distance travelled by the fluid being two of such factors. Flow resistance is inversely proportional to the cross-sectional area (or to the diameter in case of tubular passage) and is directly proportional to the distance travelled (or to the length of the path) by the fluid. In a particular flow passage, the cross-section of the flow passage may change in shape, size and area at some places or throughout the entire distance travelled by the fluid. In such cases, the section of the flow passage having the least cross-sectional area in the entire flow passage generally determines the amount of resistance faced by the fluid flow as far as the factor of cross-sectional area is concerned. Accordingly, in the apparatus for semi-occluded vocal tract exercises of the present invention, the effective cross-sectional area can be either the cross-sectional area of the central lumen at the location where an aperture is located or the cross-sectional area of the aperture, whichever is less. Therefore, in the apparatus for semi-occluded vocal tract exercises of the present invention, for every flow path, the effective minimum cross-sectional areas are different as the central lumen has a non-uniform cross-section and the apertures may also have different areas. Also, for every flow path, the distance travelled by the fluid is different. For instance, the distance travelled by the fluid in the flow path 1209 is the least among all the other flow paths. Similarly, areas of the apertures 1208, 1210 and 1212 are different from each other and, even if they are made same, the effective area for the flow paths would be different because of the changing cross-sectional area of the central lumen at each location of the apertures. So, the resistance experienced by the air flowing through each flow path is different for the apparatus for semi-occluded vocal tract exercises of the present invention.

While using the apparatus for semi-occluded vocal tract exercises of the present invention, a user may create an air flow by blowing air from the user's mouth through the inlet and then selectively block one or more apertures and/or the exit to obtain the required level of flow resistance. For example, a resistance or back pressure of 5 kilopascals can be obtained with an air flow rate of only 0.2 liters per second if the user blocks the appropriate aperture(s). Again, the same resistance of 5 kilopascals can be obtained with the same apparatus of the present invention against a flow rate of 1.2 liters per second by blocking one or more apertures and/or the exit. With the conventional use of straws or tubes for semi-occluded vocal tract exercises, to achieve the same back pressure or resistance of 5 kilopascals, separate straws of diameter 2 mm and 6 mm with lengths of 11.5 cm and 19.5 cm respectively would have been required.

Figure 12D:
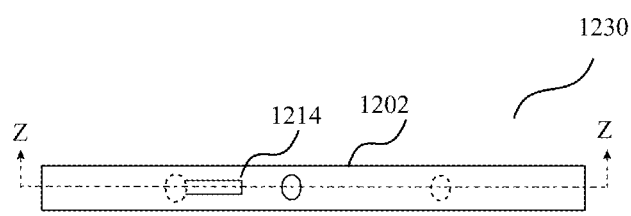
FIG. 12D illustrates a top view of a seventh embodiment of an apparatus for semi-occluded vocal tract exercises.
Figure 12E:
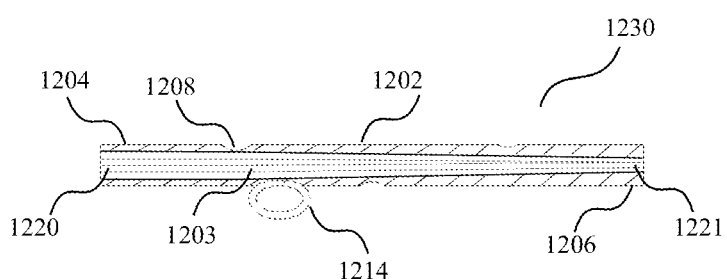
FIG. 12E illustrates a sectional view of the embodiment taken along axis Z-Z of FIG. 12D.

The embodiments of the present invention, as shown with three numbers of apertures in the figures, give a user with a choice of four major levels of resistance. A user may progressively block no apertures for little resistance, block the first aperture (e.g. 1208 of FIG. 12C) for more resistance, block the second and third apertures (e.g. 1210 and 1212 of FIG. 12C) for even more resistance, and/or block all the apertures for yet more resistance leaving only the exit 1221 open. A user may also gain small changes in resistance by blocking combinations of non-sequentially numbered apertures to lesser effect. In all embodiments it is contemplated that there may be more or less apertures than those represented in the figures. It is also contemplated in all embodiments that a user may partially block one or more apertures to gain very finely tuned control over air resistance. In another embodiment 1230, as shown in FIGS. 12D and 12E, the area of cross-section of the lumen 1203 is uniform from the proximal end 1204 to the first aperture 1208 proximal to the inlet 1220 and then decreases gradually from the first aperture 1208 to the exit 1221 at the distal end 1206.

Since the apertures and the exit may require regular and frequent blocking for a user to achieve a desired level of back pressure or resistance, the apertures and the exit may be configured to receive plugs or pegs which are dimensioned to correspond to the size and shape of the apertures and to the exit. FIG. 15A illustrates two such pegs or plugs 1502 and 1504 plugging aperture 1308 and exit 1321 respectively. These plugs can be made to fully or partially block the aperture or the exit. Such an arrangement can reduce the noise produced by the air leaving the aperture. This quieting effect may be particularly desirable for a singer using the apparatus as a vocal mute to quiet a warm-up or rehearsal.

Preferred embodiments may be easily made hand held. It is contemplated that the preferred length of the apparatus will be approximately 70-85 mm because it is a size that is easily stored in a pocket or pouch and easily manipulated in one hand. It is contemplated in all embodiments that the embodiment may be shorter or longer than this range. An apparatus with a longer air chamber i.e. longer central lumen may be preferable in that it further elongates the vocal tract, which generates several benefits for a voice user, and that it provides more surface area for air holes (apertures) to be placed for varying resistance, among other effects. A much smaller apparatus may be preferable and is contemplated in this disclosure. In embodiments shorter in length than 70 mm, it is contemplated that the primary limiting factor may be maintaining the user's ability to seal the lips onto or around the apparatus. This may be 10 mm or even less.

In certain embodiments the encasing i.e. the exterior wall may comprise rigid material or materials. In certain embodiments the encasing may comprise flexible material or materials. In certain embodiments the encasing may comprise both rigid and flexible materials. The construction may comprise metal, rubber, plastic, wood, silicone, and/or other resilient materials.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. An apparatus for semi-occluded vocal tract exercises, comprising:
    an elongated body extending along a longitudinal axis from a proximal end to a distal end;
    an inlet configured to receive air blown from a mouth of a user, said inlet being disposed at said proximal end;
    an exit configured to permit said air exit through said distal end, said exit being disposed coaxially to said inlet at said distal end;
    a plurality of diamond-shaped apertures disposed over said elongated body along said longitudinal axis, said plurality of apertures extending from an exterior wall of said elongated body to an interior wall of said elongated body; and
    a central lumen, having a gradually decreasing cross-section extending along said longitudinal axis from said inlet to said exit, said central lumen being defined by said interior wall of said elongated body and configured to put said inlet in fluid communication with said plurality of apertures and with said exit for an air flow caused by air blown from said mouth of said user;
    wherein selective blocking of said plurality of apertures and said exit enables change in a resistance offered to said air flow as per requirement of said user;
    wherein the diamond shape of said apertures is configured to increase a surface area over which air flows as it passes by and through said apertures to lower the potential energy of the exiting air which would otherwise result in generation of whistling tone due to vibration;
    and wherein the pattern of said apertures enables selective blocking of individual apertures while the apparatus is being worn to achieve variable resistance patterns for vocal therapy.

2. The apparatus for semi-occluded vocal tract exercises of claim 1, wherein said cross-section of said central lumen is not of uniform shape.

3. The apparatus for semi-occluded vocal tract exercises of claim 1, wherein a securement loop comprising an opening configured to receive a finger of said user is attached to said exterior wall such that said finger is secured to said exterior wall.

4. The apparatus for semi-occluded vocal tract exercises of claim 1, wherein said central lumen is configured to have a maximum diameter of between 1 mm and 6 mm.

5. The apparatus for semi-occluded vocal tract exercises of claim 1, wherein said exterior wall and said interior wall are made of an antimicrobial material or are covered by an antimicrobial coating.

6. The apparatus of claim 1, further comprising:
    a means for suspending said elongated body around a neck of said user,
    wherein said means for suspending comprises a necklace run through a moulded hole in said elongated body, thereby enabling said apparatus to be worn as a necklace by said user.

7. The apparatus of claim 1, further comprising:
    a means for suspending said elongated body around a neck of said user,
    wherein said means for suspending comprises a necklace attached to said elongated body, thereby enabling said apparatus to be worn as a necklace by said user.

8. The apparatus of claim 1, further comprising:
    a means for suspending said elongated body around a neck of said user, wherein said means for suspending comprises a bail attached to said elongated body and one or more selected from the group consisting of: a necklace, a chain, a ribbon, a thread, and a cord attached to said bail, thereby enabling said apparatus to be worn as a necklace by said user.

9. An apparatus for semi-occluded vocal tract exercises, comprising:
an elongated body extending along a longitudinal axis from a proximal end to a distal end;
an inlet configured to receive air blown from a mouth of a user, said inlet being disposed at said proximal end;
an exit configured to permit said air exit through said distal end, said exit being disposed coaxially to said inlet at said distal end;
a plurality of apertures disposed over said elongated body along said longitudinal axis extending from an exterior wall of said elongated body to an interior wall of said elongated body, one of said plurality of apertures being located on a first lateral side of said elongated body facing a direction substantially opposite to a second lateral side of said elongated body having a rest of said plurality of apertures; and
a securement loop configured to be held by a finger of said user attached to said exterior wall on said second lateral side of said elongated body opposite said one of said plurality of apertures being located on said first lateral side;
a central lumen, having a cross-section extending along said longitudinal axis from said inlet to said exit, said central lumen being defined by said interior wall of said elongated body and configured to put said inlet in fluid communication with said plurality of apertures and with said exit for an air flow caused by air blown from said mouth of said user;
wherein selective blocking of said plurality of apertures and said exit enables change in resistance offered to said air flow as per requirement of said user;
and wherein said plurality of apertures are diamond-shaped.

10. An apparatus for semi-occluded vocal tract exercises, comprising:
an elongated body extending along a longitudinal axis from a proximal end to a distal end;
an inlet configured to receive air blown from a mouth of a user, said inlet being disposed at said proximal end;
an exit configured to permit said air exit through said distal end, said exit being disposed coaxially to said inlet at said distal end;
a plurality of apertures disposed over said elongated body along said longitudinal axis extending from an exterior wall of said elongated body to an interior wall of said elongated body, one of said plurality of apertures being located on a first lateral side of said elongated body facing a direction substantially opposite to a second lateral side of said elongated body having a rest of said plurality of apertures; and
a securement loop configured to be held by a finger of said user attached to said exterior wall on said second lateral side of said elongated body opposite said one of said plurality of apertures being located on said first lateral side;
a central lumen, having a cross-section extending along said longitudinal axis from said inlet to said exit, said central lumen being defined by said interior wall of said elongated body and configured to put said inlet in fluid communication with said plurality of apertures and with said exit for an air flow caused by air blown from said mouth of said user;
wherein selective blocking of said plurality of apertures and said exit enables change in resistance offered to said air flow as per requirement of said user;
and wherein said central lumen is configured to have a maximum diameter of between 1 mm and 6 mm.

11. An apparatus for semi-occluded vocal tract exercises, comprising:
an elongated body extending along a longitudinal axis from a proximal end to a distal end;
an inlet configured to receive air blown from a mouth of a user, said inlet being disposed at said proximal end;
an exit configured to permit said air exit through said distal end, said exit being disposed coaxially to said inlet at said distal end;
one or more apertures disposed over said elongated body along said longitudinal axis, said one or more apertures extending from an exterior wall of said elongated body to an interior wall of said elongated body;
a central lumen, having a cross-section extending along said longitudinal axis from said inlet to said exit, said central lumen being defined by said interior wall of said elongated body and configured to put said inlet in fluid communication with said one or more apertures and with said exit for an air flow caused by air blown from said mouth of said user; and
a securement loop comprising an opening configured to receive a finger of said user such that said finger is secured to said exterior wall, and a through hole disposed along an axis intersecting said securement loop at two different points, said securement loop being attached to said exterior wall;
wherein selective blocking of said one or more apertures and said exit enables change in a resistance offered to said air flow as per requirement of said user;
wherein said one or more apertures are diamond-shaped.

* * * * *